United States Patent [19]
Cross

[11] Patent Number: 5,262,786
[45] Date of Patent: Nov. 16, 1993

[54] RADAR TEST INSTRUMENT USING OPTICAL DELAY MEANS

[75] Inventor: Michael A. Cross, Severna Park, Md.

[73] Assignee: Westinghouse Electric Corp., Pittsburgh, Pa.

[21] Appl. No.: 957,124

[22] Filed: Oct. 7, 1992

[51] Int. Cl.$^5$ ............................................. G01S 7/40
[52] U.S. Cl. ............................... 342/167; 342/174; 342/54
[58] Field of Search .............. 342/54, 167, 165, 172, 342/169, 170, 174

[56] References Cited
U.S. PATENT DOCUMENTS

| | | | |
|---|---|---|---|
| 3,906,500 | 9/1975 | Redman | 342/167 |
| 3,953,850 | 4/1976 | Redman | 342/167 |
| 3,962,657 | 6/1976 | Redman et al. | 342/171 X |
| 4,167,328 | 9/1979 | Cross et al. | 356/5 |
| 4,903,029 | 2/1990 | Newberg et al. | 342/172 |
| 5,047,782 | 9/1991 | Lew et al. | 342/169 |
| 5,177,488 | 1/1993 | Wang et al. | 342/167 |
| 5,181,036 | 1/1993 | Miler et al. | 342/15 |

OTHER PUBLICATIONS

Mortimer, "Fiber Loop Reflectors", Journal of Lightwave Technology, vol. 6, No. 7, Jul., 1988.

Primary Examiner—John B. Sotomayor
Attorney, Agent, or Firm—Eugene LeDonne

[57] ABSTRACT

A radar test system for producing multiple delayed replicas of a radio frequency radar signal is provided. A laser diode is adapted to receive the radar signal and generate a modulated optical wave signal carrying the radar signal. The modulated optical wave signal passes through a fiber optic delay line. The delayed optical wave signal engages a partially transmissive and reflective assembly wherein a first portion of the optical wave signal is transmitted therethrough and a second portion is reflected back to the laser diode. That portion of the optical wave signal reflected back to the laser diode is amplified therein and subsequently regenerated. The signal transmitted through the partially transmissive and reflective assembly is demodulated to extract the optical wave leaving only the radar signal. In this manner, a series of multiple echoes of the radar signal is produced.

22 Claims, 4 Drawing Sheets

RADAR TEST INSTRUMENT USING OPTICAL DELAY MEANS

BACKGROUND OF THE INVENTION

1. Field of the Invention

This invention relates to radar tests devices and, more particularly, to radar test instruments which produce multiple replicas of a delayed radio frequency radar signal to simulate reflection of the radar signal off of distant targets.

2. Description of Related Art

In testing radar systems, it is desirable to simulate the reflection of a radar signal by a target located a great distance away from the radar detector. Simulations of the radar system are used because it is difficult to accurately point the radar at a test target and it is often difficult to prevent other objects from obstructing the radar signal from reaching the target thereby creating clutter. Other problems involved in such actual target tests include generating a signal having a high enough power to obtain a return signal from the distant target of adequate strength and coordinating the efforts between those individuals at the radar detector and those at the test target.

Because of the problems inherent in an actual distant-target test, radar test systems are used to simulate the effect of a distant target. A single coaxial cable can be used to accomplish this effect. However, because there are enormous losses at microwave frequencies in the signal strength associated with a long co-axial cable, the radar signal is usually coupled to an optical carrier. By utilizing an optical carrier traveling through fiber optic cable, low loss in the signal strength is obtained over long distances.

There are various ways to utilize optical delay means to simulate the distant target. First, an optical delay line equal in length to the distance to and from the distant target can be used. However, the cost and bulk of such a lengthy fiberoptic cable renders this approach prohibitive. A second approach is described in U.S. Pat. No. 4,903,029. Therein, the radar signal modulates a laser light which is controllably delayed in time by transmitting the modulated laser light through a fiber optic delay line. The output of the delay line is demodulated and the extracted and delayed radar signal is returned to the radar as a test signal. This delayed replica radar test set target system is only capable of producing a single delayed replica.

In order to calibrate a radar test instrument, it is often necessary to simulate different distances. In order to accomplish this, the radar test instrument must be capable of producing multiple echoes. U.S. Pat. No. 4,167,328 discloses a passive optical range simulator device for use with optical radar ranger systems. In this device, a partial mirror is included at the input end of an optical fiber coil to present multiple target echo reflections of the laser pulses back to the optical radar ranger system undergoing tests. The range simulator device of U.S. Pat. No. 4,167,328 is incapable of testing radar pulses, being limited solely to optical pulses. Moreover, the range simulator device of U.S. Pat. No. 4,167,328 is not capable of sufficiently minimizing the loss in the system to provide consistently usable multiple echoes. Rather, the significant reflectivity losses occurring in the system cause each successive echo to achieve additional loss.

SUMMARY OF THE INVENTION

A radar test system is provided which can produce multiple delayed replicas of a radio frequency radar signal. The radar test system includes an optical wave generating means, such as a laser diode, connected to the radar signal. The laser diode generates a modulated optical wave which is used to carry the radar signal through the radar test system. An optical delay means such as a fiber optic loop or fiber optic spool is connected to the laser diode and provides a defined delay to modulated optical wave.

Once the modulated optical wave leaves the delay means, it encounters a partially transmissive/partially reflective means which separates the modulated optical wave into a first transmitted portion and a second reflected portion. The first transmitted portion proceeds to a demodulation means such as a photodetector which extracts the optical wave from the radar signal and transmits only the radar signal therefrom. The second reflected portion of the modulated optical wave is reflected back to the laser diode. The laser diode receives the reflected wave, amplifies the wave, and retransmits it through the radar test system. Although the reamplified echoes from the laser diode are not as strong as the original pulse, they do exceed the magnitude of passive reflection echoes.

Because the reflected portion of the optical wave doubles back through the delay line before being regenerated, it will produce an echo at twice the delay of the first echo. All subsequent echoes will repeat at this same frequency.

In order to maximize the output in the laser diode, a window pulse generator may be provided which is synchronized to the radar signal. The window pulse generator is calibrated to the distance of the delay line so that the laser diode is approximately at full gain when the reflected optical wave returns thereto. In this manner, the laser diode amplifies the reflected optical wave so as to minimize losses in the subsequent echoes.

If desired, pulse culling means can be provided to block certain of the multiple echoes and permit only desired echoes to be transmitted to the radar test horn. Such pulse culling means is synchronized to the radar signal which controls an adjustable delay element to trigger a pulse generator. The pulse generator transmits culling pulses to a fast microwave switch to either block the radar pulses exiting the photodetector or allow them to pass through to the radar test horn.

These, as well as other features and advantages of the present invention, will become apparent from consideration of the following detailed description and accompanying drawings.

DETAILED DESCRIPTION OF THE PREFERRED EMBODIMENTS

Figure 1:
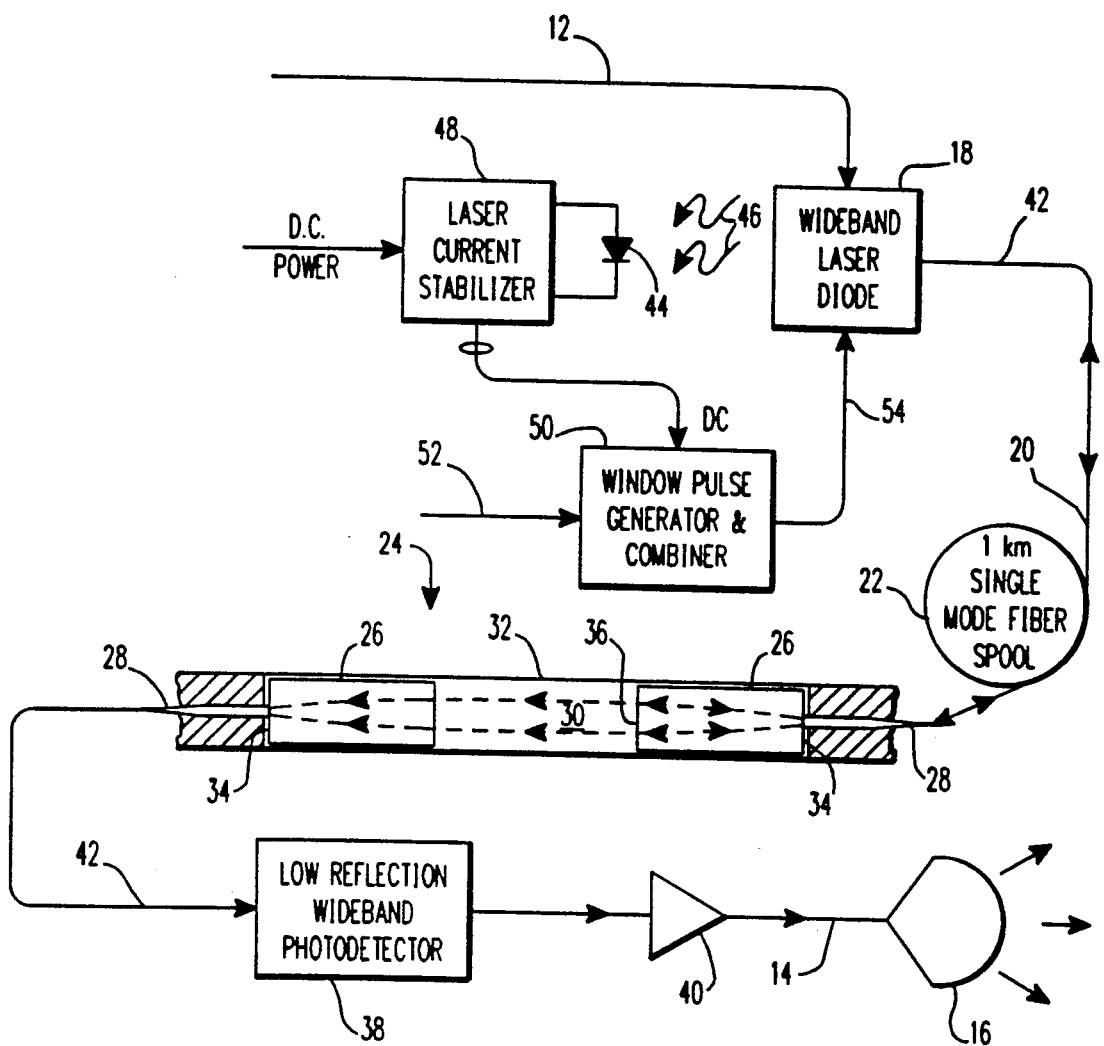
FIG. 1 is a schematic representation of a first presently preferred embodiment of the radar test instrument of the present invention.

FIG. 1 shows radar test instrument 10 which is adapted to receive the input of radar pulse stream 12 to produce a delayed radar pulse stream 14 which can be detected by means of radar test horn 16. Alternatively, the delayed radar pulse stream 14 can be fed directly into the radar under test such as by means of a short coaxial cable. In operation, radar pulse stream 12, which is typically X-band, is received by wide band laser diode 18 which is coupled to fiber optic delay line 20 formed primarily of one kilometer single mode fiber spool 22. Such a fiber spool 22 is readily available and other fiber optic delay lines can be used as well.

The fiber optic delay line 20 is connected to a partially reflective and transmissive means (PRT) 24. Quarter pitch graded index rod lenses 26 are butt coupled to respective fiber pigtails 28 providing a collimated space 30 therebetween. An alignment sleeve 32 is provided not only to maintain the alignment of lenses 26 but also to insure accurate centering of fiber pigtails 28 on the respective outer faces 34 of lenses 26. A mirror surface 36 provided on the first lens 26 serves as the partially transmissive and reflective element of PRT assembly 24. Surface 36 is a low loss multi-layer dielectric coating which is deposited directly on the inner surface of the first lens 26. The required coating reflectivity at the laser wave length is predetermined by experiment. Surface 36 permits a portion of the optical wave passing through the first lens 26 to pass therethrough while reflecting a second portion back to laser diode 18.

That portion of the optical wave that passes through PRT assembly 24 is demodulated at a low reflection wide band photodetector 38. Photodetector 38 extracts the optical wave from the radar pulse stream thereby permitting only the radar pulse stream to pass therethrough. The radar pulse stream passes through low noise amplifier 40 before proceeding to radar test horn 16. The wide band laser diode 18 and photodetector 38 are preferably capable of operating at any microwave frequency through X-band. Such laser diode 18 and photodetector 38 are commercially available. Ortel Corporation provides a directly modulated laser diode 18 with bias stabilization occurring at 1300 nm wavelength and a complimentary photodetector 38 featuring low return loss. Both laser diode 18 and photodetector 38 are equipped with single mode fiber pigtails 42 which guarantee coupling stability and minimum optical reflection from photodetector 38. These are important features for the practical realization of the radar test instrument 10 of the present invention.

The portion of the optical signal that is reflected by surface 36 travels back through fiberoptic delay line 20 until it is received in laser diode 18. Laser diode 18 amplifies the reflected signal to a convenient level to feed radar test horn 16. The reamplified echo from laser diode 18 is not as strong as the original pulse but does exceed the magnitude of a passive reflecton echo. Once the received signal is amplified by laser diode 18, it is retransmitted through fiber optic delay line 20 and into PRT assembly 24. Therein, the signal is partially reflected and partially transmitted as described before.

In the embodiment of FIG. 1 the delayed pulse stream 14 seen by the radar comprises the first pass pulse at 5 microseconds after the main bang and echoes at 10 microsecond intervals thereafter. The number of usable echoes depends upon the bandwidth of fiber delay line 20, fiber losses being secondary. A typical step index single mode fiber designed for operation at 1300 nm wavelength exhibits very low dispersion and can achieve bandwidths in excess of 50 $GH_z$ sec.km with losses of less than 0.4 db/km. Accordingly, an X-band signal can be delayed at least 25 $\mu$sec before dispersion effects degrade the recovered signal and lower frequency radar signals proportionately longer. If very long delays are required, the optical system may be designed for operation at 1550 nm wavelength to take advantage of dispersion shifted single mode fiber and even lower-loss, typically in the range of 0.21 db/km. Dispersion shifted fiber at 1550 nm wavelength can double the effective bandwidth relative to step index single mode fiber operating at 1300 nm wavelength.

The bias current of laser diode 18 may be stabilized by a low frequency control loop which uses as its input the signal from a laser monitor photodetector 44 which receives light 46 from the rear facet of laser diode 18. Laser current stabilizer 48 maintains the D.C. bias at the lasing threshold value so that addition of a window pulse brings the bias current up to the normal operating value of 3 to 4 times threshold required to achieve full modulation bandwidth. Window generator 50 receives synchronizing pulses 52 at the radar PRF and generates a pulse stream 54 which may be adjusted to coincide with any or all pulses arriving at laser diode 18. Those pulses arriving at laser diode 18 include both the modulating pulse stream and the reflected optical pulse stream. The window pulse widths are selectable to match different radar pulse width requirements and these pulses may be combined with the D.C. bias by means of a pulse transformer as a circuit isolation device. The purpose of the fully adjustable window pulse generator 50 is to optimize echo production and permit selection of echoes following the first pass pulse. The ability to gate the modulating pulse stream with synchronized window pulses can be useful in selecting main bang pulses from a high PRF radar pulse stream 12 where the interpulse period is shorter than the maximum desired echo delay.

Figure 2:
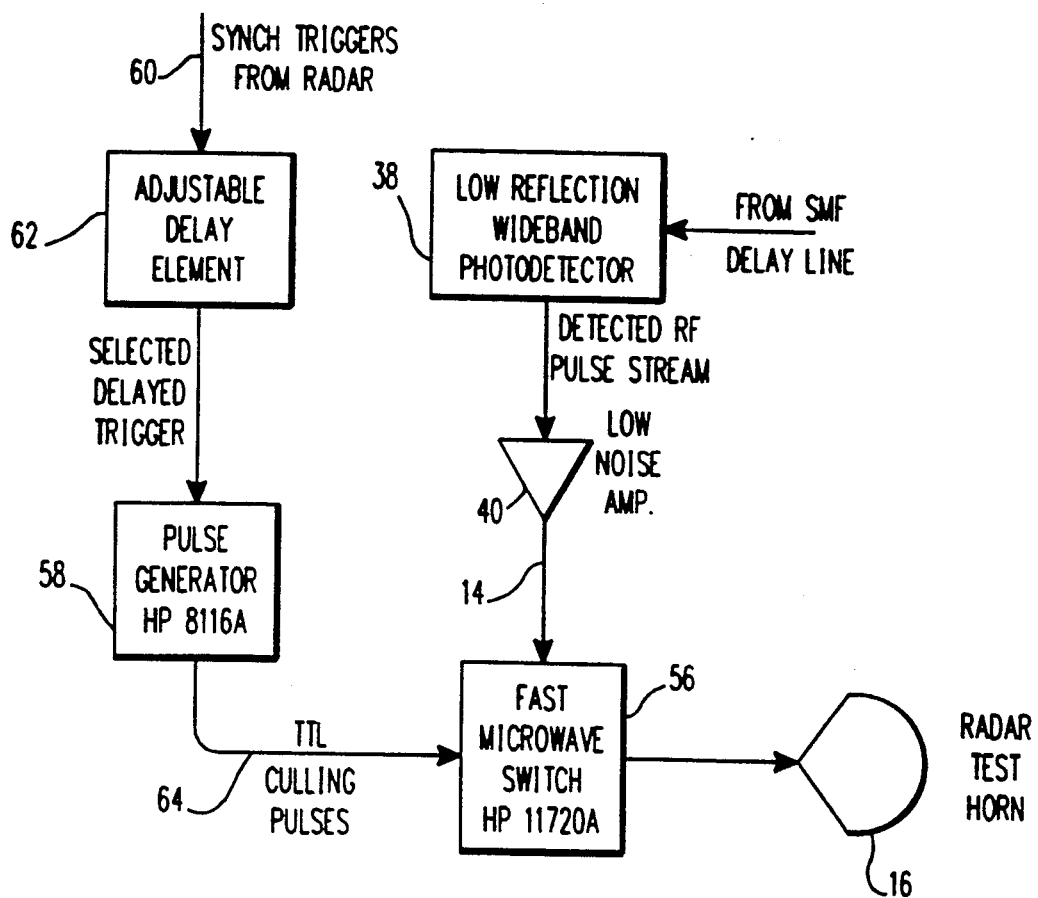
FIG. 2 is a schematic representation of a pulse culling means for use with the radar test instrument of the present invention.

If a single high order echo is required in the absence of its predecessors, this single echo must be culled from the echo stream after photodetection by means of a fast microwave switch 56 inserted between low noise amplifier 40 and radar test horn 16 as shown in FIG. 2. Fast microwave switch 56 is driven by pulse generator 58 which is activated by trigger 60 synchronized to radar pulse stream 12. Trigger 60 can be delayed in time by passing through adjustable delay element 62. By selecting the appropriate delay for adjustable delay element 62, a culling pulse 64 can be transmitted by pulse generator 58 to fast microwave switch 56 to coincide with the desired echo of radar pulse stream 14. In this manner, a single desired delayed echo can be passed on to radar test horn 16.

Figure 3:
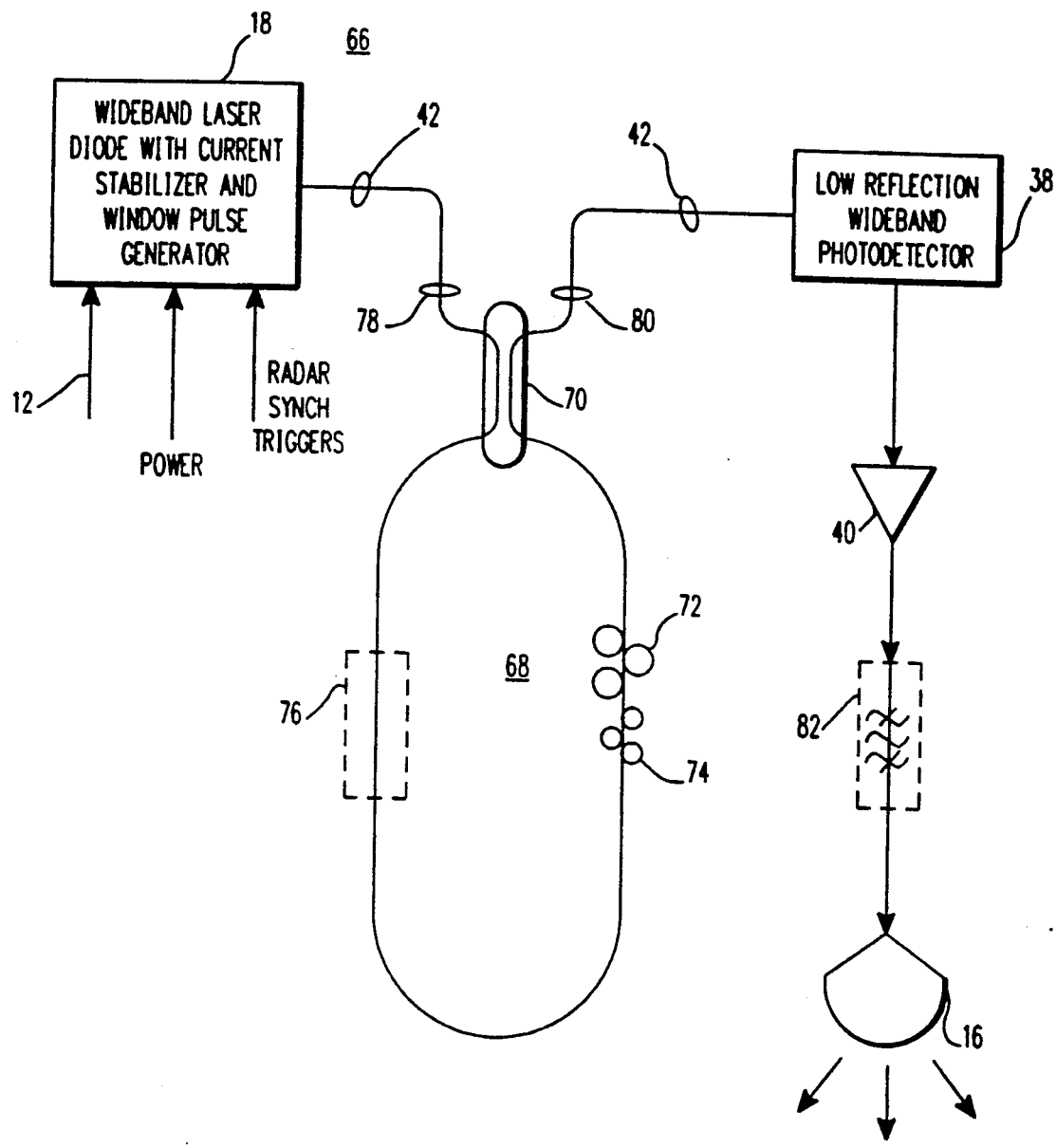
FIG. 3 is a presently preferred embodiment of the radar test instrument of the present invention.

Radar test instrument 10 of FIG. 1 produces fixed reflective signals. Adjustable radar test instrument 66 shown in FIG. 3 is capable of producing adjustable reflected optical signals. Adjustable radar test instrument 66 employs a fiber loop reflector 68 which combines the functions of delay line and partially reflective and transmissive means. Fiber loop reflector 68 includes fused directional coupler 70 and fine polarization controllers 72 and coarse polarization controllers 74. Optionally, phase retarder 76 may also be provided. The PRT assembly 24 shown in FIG. 1 is eliminated along with the need for special coatings.

The reflection/transmission ratio of fiber loop reflector 68 can be adjusted on a continuous basis. By controlling fine and coarse polarization controllers 72 and 74 or phase retarder 76, the polarization or phase of the optical signals passing through fiber loop reflector 68 can be adjusted. Changes in the polarization or phase of the optical signal passing through reflector 68 changes the ratio of the optical signal directed by fused direction coupler 70 to port 78 and port 80. That portion of the optical signal transmitted to port 78 is redirected to laser diode 18. That portion of the optical signal directed by fused directional coupler 70 to port 80 proceeds to radar test horn 16.

The echoes produced by adjustable radar test instrument 66 are at equal 5 μsec intervals for 1 km delay line. Fiber loop reflector 68 performs equally well at 1300 nm as at 1500 nm wavelengths using conventional and dispersion shifted SMF. Fused directional coupler 70 is merely selected to work with the appropriate wavelength. It is preferable that coupler 70 be of a polarization-insensitive design. For operation with large delays, use of 1550 nm wavelength and 2 km dispersion shifted delay line would still be preferred and provide 10 μsec interval echoes.

The fiber loop reflector 68 of adjustable radar test instrument 66 is configured to partition the reflected optical energy so that the wideband laser diode 18 sees a small continuously controllable fraction of its emission, while photodetector 38 at port 80 receives the residue. In all other respects, adjustable radar test instrument 66 is configured in the same manner as radar test instrument 10, including the use of low reflection spliced fiber optic connectors throughout. If desired, an optional bandpass filter 82 may be provided between amplifier 40 and radar test horn 16 to enhance the signal-to-noise ratio.

The properties of fiber loop reflectors 68 are well known. For an ideal, lossless loop reflector with a coupler splitting ratio of exactly 50% ($\kappa=0.5$) laser energy entering port 78 of coupler 70 is split into two counterpropagating fields which upon arrival back at coupler 70 are so phased that all the energy is coupled into port 78 and none into port 80. This assumes no naturally occurring birefringence in the delay line. However, if an arbitrary amount of birefrigence occurs in a real delay line, an arbitrary power split is produced between ports 78 and 80. This power split occurs because birefrigence causes a variation of optical path length as a function of polarization angle with respect to fast and slow axes. The counterpropagating fields then experience different optical path lengths before returning to the coupler, the consequent phase difference between them determining the transmitted (port 80) to reflected (port 78) power ratio.

Adjustable radar test instrument 66 exploits the ability of fiber loop reflector 68 to adjust the power split between ports 78 and 80 by control of the birefrigence within fiber loop reflector 68 and by selection of the coupling ratio of the fused directional coupler 70. Polarization angle controllers 72 and 74 accomplish the former and suitable coupler design the latter. If very smooth control of loop birefrigence becomes necessary phase retarder 76 may optionally be invoked. An electrically controlled liquid crystal fractional wave plate can perform this function if inserted in collimated space as provided by PRT assembly 24 of radar test instrument 10. The liquid crystal cell would be tilted with respect to the optical axis to deflect reflected energy and the graded index rod lenses 26 would have anti-reflection coatings only.

Figure 4:
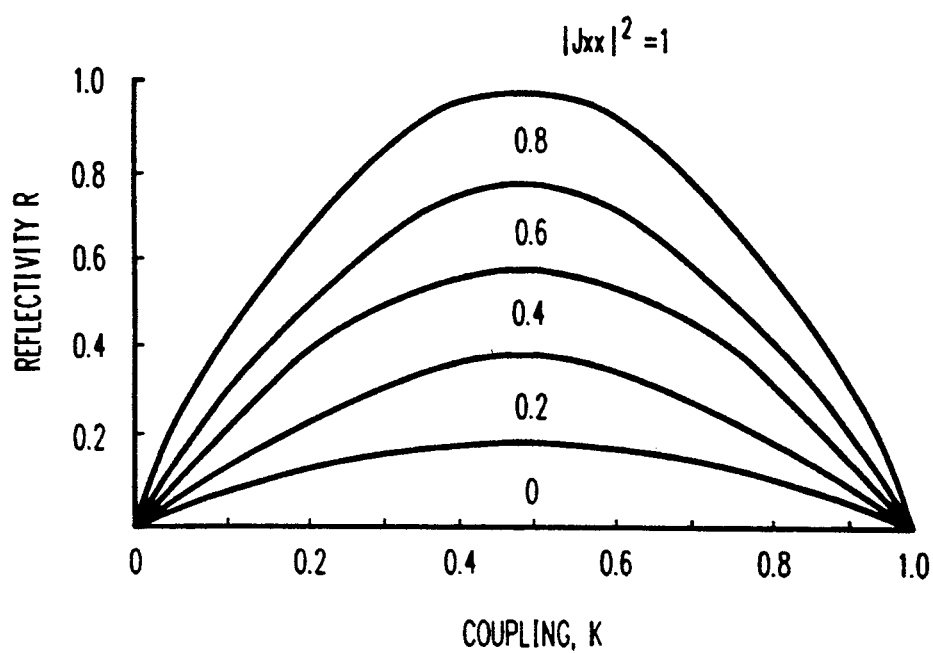
FIG. 4 is a graph showing the fiber loop reflectivity as a function of coupler splitting ratio and birefringence for the radar test instrument of FIG. 3.

FIG. 4 is a graph derived from the article "Fiber Loop Reflectors," David B. Mortimore, Journal of Lightwave Technology, Volume 6, No. 7, Jul., 1988. FIG. 4 shows reflectivity (percentage of incident power returned to port 78) as a function of directional coupler splitting ratio and fiber loop birefrigence (intrinsic plus induced) parameter $|J_{xx}|^2$. When $|J_{xx}|^2=1$, there is 100% reflectivity into port 78 for $\kappa=0.5$ with reduced reflectivity at any other value of $\kappa$. Assuming practical $\kappa$ factors for directional coupler 70 (such as 0.2–0.8), $|J_{xx}|^2$ might take values in the range 0.1 to 0.3, thereby allowing some margin for component losses.

In the foregoing specification certain preferred practices and embodiments of this invention has been set out, however, it will be understood that the invention may be otherwise embodied within the scope of the following claims.

I claim:

1. A radar test system for producing multiple delayed replicas of a radio frequency radar signal comprising:
   (a) optical wave generating means connected to said radar signal for generating a modulated optical wave carrying said radar signal;
   (b) optical delay means connected to said optical wave generating means for delaying said modulated optical wave;
   (c) partially transmissive and reflective means connected to said optical delay means opposite said optical wave generating means for transmitting a first portion of said modulated optical wave and reflecting a second portion of said modulated optical wave;
   (d) optical wave regeneration means provided in said optical wave generating means for receiving said second portion of said modulated optical wave, amplifying said received portion, and transmitting said amplified received portion to said optical delay means; and
   (e) demodulation means for receiving said first portion of said modulated optical wave for extracting said optical wave from said radar signal carried thereon.

2. The radar test system of claim 1 further comprising window pulse generator means to control said optical wave generating means.

3. The radar test system of claim 2 wherein said window pulse generator means is synchronized to said radar signal.

4. The radar test system of claim 2 wherein said partially transmissive and reflective means is fixed with respect to the ratio of reflective to transmitted signal.

5. The radar test system of claim 4 wherein said partially transmissive and reflective means comprises an assembly including an alignment sleeve having a pair of graded index rod lenses provided at either end thereof, one end of said alignment sleeve connected to said optical delay means, the other end of said alignment sleeve connected to said demodulation means, a collimated space provided between said pair of graded index rod lenses, wherein said modulated optical wave enters the graded index rod lens adjacent said optical delay means and is partially reflected therein.

6. The radar test system of claim 5 wherein the graded index rod lens adjacent said optical delay means partially reflects the modulated optical wave signal at the inner surface thereof.

7. The radar test system of claim 6 wherein the inner surface of the graded index rod lens adjacent said optical delay means is coated with a low loss multi-layer dielectric coating deposited directly thereon.

8. The radar test system of claim 4 wherein said optical wave generating means and optical wave regeneration means is a wideband laser diode.

9. The radar test system of claim 4 wherein said optical delay means is a single mode fiber optic spool.

10. The radar test system of claim 4 wherein said demodulation means is a low reflection wideband photodetector.

11. The radar test system of claim 2 wherein said partially transmissive and reflective means is adjustable with respect to the ratio of reflection and transmission.

12. The radar test system of claim 11 wherein said partially transmissive and reflective means comprises a fiber loop reflector including a fused directional coupler for splitting said modulated optical wave into a pair of counterpropagating fields and polarization controllers to adjust at least one of said pair of counterpropagating fields.

13. The radar test system of claim 12 further comprising a phase retarder for adjusting the phase of at least one of said pair of counterpropagating fields.

14. The radar test system of claim 11 wherein said optical wave generating means and said optical wave regeneration means are laser diodes.

15. The radar test system of claim 11 wherein said optical delay means is a fiber loop including a fiber optic spool.

16. The radar test system of claim 11 wherein said demodulation means is a low reflection wide band photodetector.

17. The radar test system of claim 11 further comprising an optional band pass filter provided between said demodulation means and the output.

18. The radar test system of claim 2 further comprising pulse culling means for blocking all but the desired echoes.

19. The radar test system of claim 18 wherein said pulse culling means comprises a fast microwave switch provided between said demodulation means and the output, said fast microwave switch being driven by a pulse generator, said pulse generator being synchronized to said radar signal, said synchronized radar signal being adjustably delayed to select the desired echo to pass through said fast microwave switch.

20. A method for producing multiple delayed replicas of a radio frequency radar signal comprising the steps of
(a) receiving a radar signal;
(b) generating a modulated optical wave signal to carry said radar signal;
(c) delaying said modulated optical wave signal;
(d) transmitting a first portion of said delayed modulated optical wave signal and reflecting a second portion of said delayed modulated optical wave signal;
(e) demodulating said first portion of said delayed optical wave signal to extract said optical wave signal from said radar signal carried thereon;
(f) passing said demodulated radar signal to an output;
(g) regenerating a modulated optical wave signal by receiving said second portion of said delayed modulated optical wave signal, amplifying said received portion, and transmitting said amplified received portion.

21. The method of claim 20 further comprising the step of generating a window pulse to control the steps of generating a modulated optical wave and regenerating a modulated optical wave.

22. The method of claim 21 further comprising the step of culling said output demodulated radar signals to select a desired echo of said radar pulses.

* * * * *